C. EKISS.
SPRING WHEEL.
APPLICATION FILED OCT. 29, 1913.

1,134,828.

Patented Apr. 6, 1915.

Witnesses
Frank Hough
U. B. Hillyard

Inventor
Carl Ekiss,
By Victor J. Evans
Attorney

UNITED STATES PATENT OFFICE.

CARL EKISS, OF BETHANY, ILLINOIS.

SPRING-WHEEL.

1,134,828. Specification of Letters Patent. Patented Apr. 6, 1915.

Application filed October 29, 1913. Serial No. 798,103.

Be it known that I, CARL EKISS, a citizen of the United States, residing at Bethany, in the county of Moultrie and State of Illinois, have invented new and useful Improvements in Spring-Wheels, of which the following is a specification.

The invention has relation to vehicle wheels of the type embodying spring spokes the purpose being the provision of a wheel which will absorb shock and vibration and prevent excessive wear upon the vehicle and parts mounted thereon and add materially to the comfort of the passenger.

The invention provides a wheel of novel formation embodying a sectional rim and having such rim sections connected to the hub by means of spring spokes, the rim being channeled and receiving a tire which in the present instance consists of a wire coil which is seated in the channel of the rim.

The invention consists of the novel features, details of construction and combination of parts, which hereinafter will be more particularly set forth, illustrated in the accompanying drawings, and pointed out in the appended claim.

Figure 1:
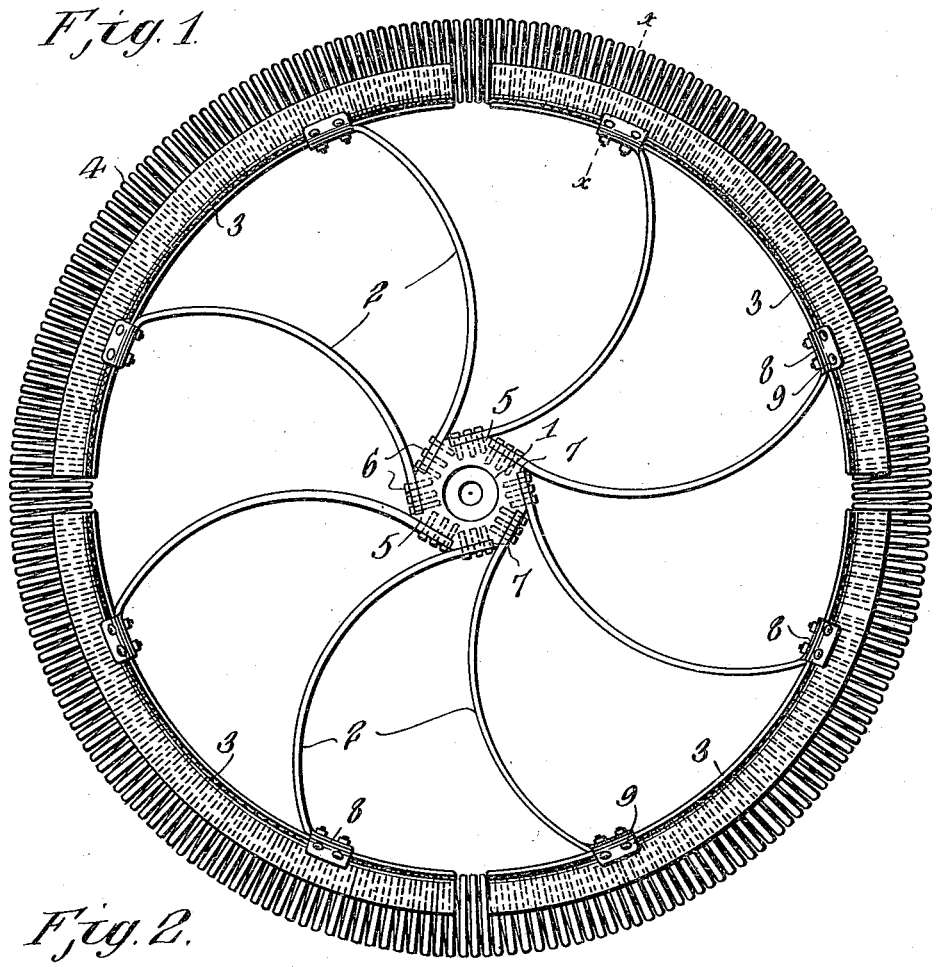
Figure 2:
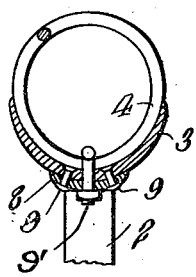
Figure 3:

Referring to the drawings, forming a part of the specification, Figure 1 is a side view of a vehicle wheel embodying the invention. Fig. 2 is a transverse section of the rim portion of the wheel on the line $x$—$x$ of Fig. 1. Fig. 3 is a detail perspective view of the outer end of one of the spring spokes.

Corresponding and like parts are referred to in the following description, and indicated in all of the views of the drawings, by the same reference characters.

The wheel which is designed chiefly for vehicles comprises a hub 1, spring spokes 2, sectional rim 3 and tire 4. The hub 1 is formed with a plurality of faces 5 which form seats for the inner ends of the spokes 2, such spokes being secured to the hub by means of fastenings 6 which may consist of screws, bolts or the like. The faces 5 have an approximate tangential arrangement and are provided at their inner ends with shoulders 7 against which the inner ends of the spokes abut. The spokes 2 curve throughout their length and are formed at their outer ends with heads 8 which curve transversely and longitudinally to conform to the inner side of the rim. The heads 8 are formed with the spokes 2 as a part thereof and are secured to the rim sections 3 by rivets 9 or analogous fastenings. Each of the spokes is formed of a flat bar and is curved throughout its length to approximately a bow. The spokes are arranged to have the curvature face in the same direction.

A suitable fastening means in the form of a headed bolt, as indicated by the reference character 9', is employed for connecting the heads 8, the rim sections 3, and the inner portion of the tire member 4 with one another, and such means permits of a detachable connection of the said heads, rim sections, and tire, respectively.

The rim is formed of a number of sections 3 which are of like formation and are arranged with spaces between continuous ends of adjacent sections thereby making provision for a limited movement of the sections when the wheel is in active service. The rim sections are channeled in their outer sides so as to form a seat in which the tire 4 is fitted. It is to be understood that a wheel embodying the invention may comprise any number of rim sections and that each of such rim sections may be supported by any number of spokes as shown, each rim section is supported by two spokes the latter being attached at their outer ends to the rim section at the extremities thereof.

The tire 4 preferably consists of a wire coil which is fitted in the channel of the rim and retained in place by the contractile action of the coil or in any suitable way. This form of tire besides being resilient presents a roughened surface thereby preventing skidding and is also puncture proof and capable of resisting wear and may be adjusted to bring new portions in position to receive the wear as it is obvious that the tire may be turned in its seat in the rim.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

A vehicle wheel comprising a hub, a rim channeled in its outer side for its entire length and comprising a plurality of non-connected sections, spring spokes having integral heads at one end thereof, said heads being curved longitudinally and transversely to conform to the curvature of the rim sections both transversely and circumferentially, the spokes being connected at one end with the hub while the heads of the spokes are connected with the rim sections at points adjacent the terminals thereof, a tire member holding the separated rim sections in assembled relation, and means for detachably securing the inner portion of the tire member to the rim sections and the integral heads of the spokes.

In testimony whereof I affix my signature in presence of two witnesses.

CARL EKISS.

Witnesses:
W. D. EKISS,
G. T. HILL.

Copies of this patent may be obtained for five cents each, by addressing the "Commissioner of Patents, Washington, D. C."